Patented May 21, 1940

2,201,156

UNITED STATES PATENT OFFICE 2,201,156

(POLYHALOPHENOXY-ALKYL) (THIO-CYANO-ALKYL) ETHERS

Gerald H. Coleman and Clarence L. Moyle, Midland, Mich., assignors to The Dow Chemical Company, Midland, Mich., a corporation of Michigan No Drawing. Application April 22, 1939, Serial No. 269,456

11 Claims. (Cl. 260—454)

The present invention concerns a new class of compounds, namely, the (polyhalophenoxy-alkyl) (thiocyano-alkyl) ethers.

We have prepared compounds of the aforementioned class, determined certain physical properties thereof whereby they may be readily identified, and found that they are particularly useful as insecticidal toxicants. These compounds are for the most part viscous, high-boiling liquids, substantially insoluble in water, but somewhat soluble in most organic solvents.

The preparation of our new compounds can be accomplished by reacting (polyhalophenoxy-alkyl) (halo-alkyl) ethers with an alcoholic solution of an alkali metal thiocyanate. For example, a (polyhalophenoxy-alkyl) (halo-alkyl) ether such as beta-(2,4,6-trichlorophenoxy)-beta'-chloro-diethyl ether and potassium thiocyanate are dissolved in absolute alcohol, and the resulting solution heated to its boiling temperature under reflux for a period of time sufficient to accomplish the reaction. The reaction temperature is generally between about 80° and 90° C., although somewhat lower or higher temperatures may be employed, the reaction being carried out under autogenous pressure where temperatures above the boiling point of the mixture prevail. While any suitable proportions of the (polyhalophenoxy-alkyl) (halo-alkyl) ether compound and alkali metal thiocyanate may be employed, substantially equimolecular proportions thereof have been found to give the desired compounds in good yield. The alcohol is preferably employed in an amount sufficient to maintain the reactants and final ether product in solution. Following completion of the reaction, the mixture is cooled to room temperature, the major part of the alcohol solvent removed by distillation, and the residue diluted with water, whereupon a water immiscible layer of the organic thiocyanate separates from solution. This layer is separated as by decantation, washed with water, and used either in its crude form or fractionally distilled to obtain the desired (polyhalophenoxy-alkyl) (thiocyano-alkyl) ether in substantially pure form.

The (polyhalophenoxy-alkyl) (halo-alkyl) ethers employed as reactants in the preparation of our new compounds are obtained by reaction of polyhalo-phenolates with di-(halo-alkyl) ethers under those conditions of temperature, pressure and molecular proportion favoring the substitution of a polyhalophenoxy group for one only of the halogens of the di-(halo-alkyl) ether compound. Our co-pending application, Serial No. 225,415, filed August 17, 1938, describes the preparation of a number of these compounds.

While the invention is broadly concerned with all (polyhalophenoxy-alkyl) (thiocyano-alkyl) ethers, a preferred embodiment resides in those compounds having the following formula:

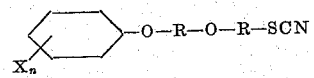

wherein each R represents an alkylene radical, X represents halogen, and $n$ is an integer from 3 to 5, inclusive.

The following examples describe in detail the preparation of certain individual members of our new class of compounds, but are not to be construed as limiting the invention.

Example 1

291.5 grams (0.958 mol) of beta-(2,4,6-trichlorophenoxy)-beta'-chloro-diethyl ether (boiling point 168° to 170° C. at 4 millimeters pressure), 102.5 grams (1.054 mols) of potassium thiocyanate, and 245 grams of absolute ethyl alcohol were reacted together for 48 hours at 82° to 83° C. The alcohol was then distilled out of the mixture, and the residue washed with water and distilled whereby there was obtained 185 grams (0.567 mol) of beta-(2,4,6-trichlorophenoxy)-beta'-thiocyano-diethyl ether as a viscous liquid boiling at 216° to 218° C. at 4 millimeters pressure and having a specific gravity of 1.405 at 20°/4° C. Solutions of the above compound in kerosene were tested by the Peet-Grady method against three-day old house flies. The observed knockdowns in 10 minutes were 94 per cent for a 1 per cent solution, and 100 per cent for 2 and 3 per cent solutions. The 48 hour mortalities were 58, 73, and 81 per cent, respectively.

Example 2

In a similar manner 94.5 grams (0.271 mol) of beta-(2-bromo-4,6-dichlorophenoxy)-beta'-chloro-diethyl ether (boiling point 189° to 195° C. at 6 millimeters pressure) was mixed with 23.6 grams (0.291 mol) of sodium thiocyanate and 100 milliliters of absolute ethyl alcohol, and the mixture heated at 79° C. and under reflux for 48 hours. The reaction mixture was then cooled to room temperature, filtered free of salt, and fractionally distilled whereby there was obtained 39.5 grams of beta-(2-bromo-4,6-dichlorophenoxy)-beta'-thiocyano-diethyl ether as a pale yellow colored liquid boiling at 240° to 245° C. at 6 millimeters pressure and having a specific gravity of 1.554 at 25°/4° C.

Other (polyhalophenoxy-alkyl) (halo-alkyl) ethers which may be substituted for those shown in the examples to produce (polyhalophenoxy-alkyl) (thiocyano-alkyl) ethers falling within the scope of this invention include beta-(2,4-dichlorophenoxy)-beta'-chloro-diethyl ether boiling at 148° to 149° C. at 1.5 millimeters pressure; beta - (2,4,5-trichlorophenoxy) - beta'- chloro-diethyl ether melting at 60° C.; beta-(2,6-dichloro-4 - bromophenoxy) - beta' - chloro-diethyl ether having a specific gravity of 1.596 at 25°/4° C.; beta-(2-bromo-4-chlorophenoxy)- beta' - chloro-diethyl ether having a specific gravity of 1.536 at 25°/4° C.; and the like. In a similar manner (polyhalophenoxy-alkyl) (thiocyano-alkyl) ethers may be prepared, such as beta-2,4,5,6-tetrachlorophenoxy)-beta'-thiocyano - diethyl ether, beta-(2,4,6-tribromophenoxy) - beta' - thiocyano-diethyl ether, beta-(pentachlorophenoxy)-beta'-thiocyano-diethyl ether, beta-(2,4-diiodo-phenoxy)-beta'-thiocyano-diethyl ether, (beta-2,4,6-trichlorophenoxy-ethyl) (gamma'-thiocyano-propyl) ether, gamma-(2,4-dibromophenoxy)-gamma'-thiocyano-dipropyl ether, (beta-2,5-dichlorophenoxy-ethyl) (delta'-thiocyano-butyl) ether, beta -(2,3,6-trichloro - 4 - bromophenoxy) - beta'-thiocyano-dibutyl ether, (2,4,6-trichlorophenoxy-amyl) (thiocyano-amyl) ether, beta-2,4,5-trichlorophenoxy)-beta'-thiocyano-dihexyl ether, and the like.

We claim:

1. A (polyhalophenoxy-alkyl) (thiocyano-alkyl) ether.

2. A compound having the formula

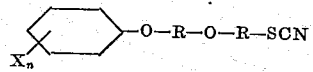

wherein each R represents an alkylene radical, X represents halogen and $n$ is an integer from 3 to 5, inclusive.

3. A beta-(polyhalophenoxy)-beta'-thiocyano-diethyl ether.

4. A compound having the formula

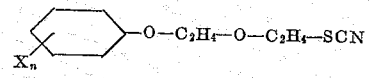

wherein X represents halogen and $n$ is an integer from 3 to 5, inclusive.

5. A (trihalophenoxy - alkyl) (thiocyano-alkyl) ether.

6. A beta -(trihalophenoxy) - beta'- thiocyano-diethyl ether.

7. A (polyhalophenoxy-alkyl) (thiocyano-alkyl) ether having both chlorine and bromine directly attached to the benzene ring.

8. A beta-(polyhalophenoxy)-beta'-thiocyano-diethyl ether having both chlorine and bromine directly attached to the benzene ring.

9. A beta -(polychlorophenoxy)- beta'- thiocyano-diethyl ether.

10. Beta -(2,4,6-trichlorophenoxy) - beta'- thiocyano-diethyl ether.

11. Beta - (2 - bromo - 4,6 - dichlorophenoxy) - beta'-thiocyano-diethyl ether.

GERALD H. COLEMAN.
CLARENCE L. MOYLE.